Nov. 25, 1958     C. E. HOCKERT ET AL     2,861,421
GAS TURBINE ENGINE WITH OIL SPLASH SHIELDS
Filed Aug. 27, 1954                                                         4 Sheets-Sheet 1

INVENTORS
Chester E. Hockert &
BY Clair A. Short, Jr.
Paul Fitzpatrick
ATTORNEY

Nov. 25, 1958 C. E. HOCKERT ET AL 2,861,421
GAS TURBINE ENGINE WITH OIL SPLASH SHIELDS
Filed Aug. 27, 1954 4 Sheets-Sheet 2

INVENTORS
Chester E. Hockert, &
BY Clair A. Short, Jr.
Paul Fitzpatrick
ATTORNEY Nov. 25, 1958   C. E. HOCKERT ET AL   2,861,421
GAS TURBINE ENGINE WITH OIL SPLASH SHIELDS
Filed Aug. 27, 1954   4 Sheets-Sheet 3

INVENTORS
Chester E. Hockert, &
BY Clair A. Short, Jr.
Paul Fitzpatrick
ATTORNEY Nov. 25, 1958   C. E. HOCKERT ET AL   2,861,421
GAS TURBINE ENGINE WITH OIL SPLASH SHIELDS
Filed Aug. 27, 1954   4 Sheets-Sheet 4

INVENTORS
Chester E. Hockert &
BY Clair A. Short, Jr.
Paul Fitzpatrick
ATTORNEY

United States Patent Office 2,861,421
Patented Nov. 25, 1958

2,861,421

GAS TURBINE ENGINE WITH OIL SPLASH SHIELDS

Chester E. Hockert and Clair A. Short, Jr., Indianapolis, Ind., assignors to General Motors Corporation, Detroit, Mich., a corporation of Delaware Application August 27, 1954, Serial No. 452,590

3 Claims. (Cl. 60—39.08)

This invention relates to gas turbine engines and the lubrication thereof and particularly to a system providing improved protection of the oil from the heat of the engine.

In some cases it has been found that the oil circulated to the main shaft bearings of gas turbine engines has been heated so as to be greatly deteriorated or be decomposed to some extent. In some cases coking of the oil has occurred with resulting damage to the engine from the particles of carbon in the lubricating oil. The bearings at the rear end of the compressor, the turbine bearings, and any bearings between the turbine and compressor of a gas turbine engine are exposed to a large measure to the heat of the combustion products. The rear compressor bearing is exposed to a lesser extent to heat radiating from the combustion chamber but is exposed to some extent to the rather high temperature of the compressor discharge air.

In engines of the sort described herein there is an internal frame of the engine, commonly called an aft frame, extending from the compressor to the turbine within the combustion chambers, which frame encloses the turbine shaft, the rear end of the compressor shaft, the couplings between them, and the shaft bearings between the compressor and turbine. Oil delivered to these bearings in the past has been allowed to flow from the bearings into this frame, which acts as a sump from which it is returned by scavenge pumps to the outside of the engine.

According to this invention, shields are disposed within the frame of the engine so as to protect the bearings to a large extent from radiation of heat and so as to catch the oil thrown off from the bearings and return it without allowing the oil to come in contact with the hot engine frame. As a result, the oil is heated to a much lesser extent and decomposition or deterioration of the oil from heat are eliminated.

The nature of the invention and the advantages thereof will be more fully understood from the following description and drawings which illustrate the application of invention to an axial flow gas turbine engine.

Referring to the drawings.

Figure 1:
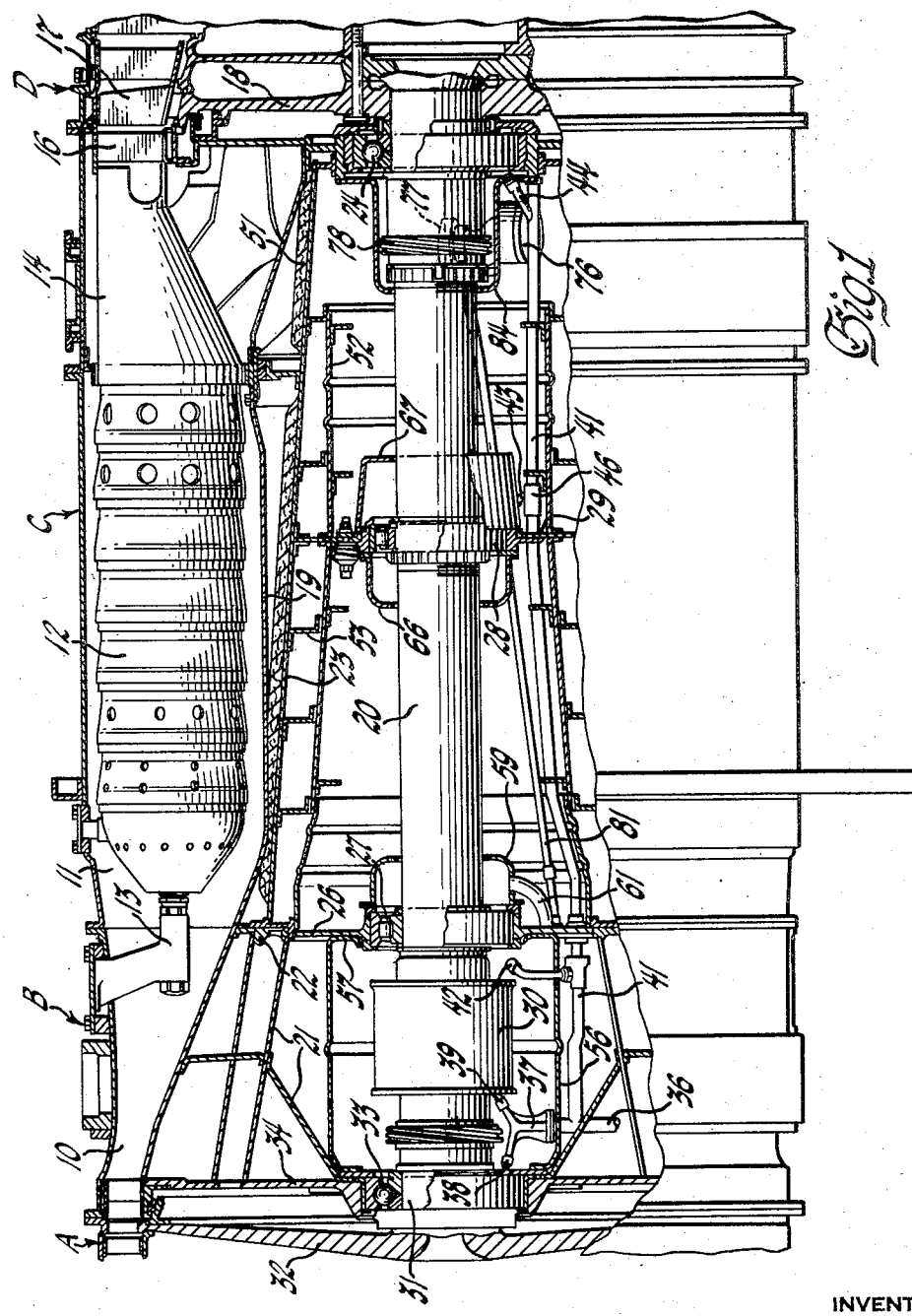
Fig. 1 is a sectional view taken on a plane containing the axis of the engine and showing the intermediate portion of the engine from the last compressor wheel to the first turbine wheel.
Figure 2:
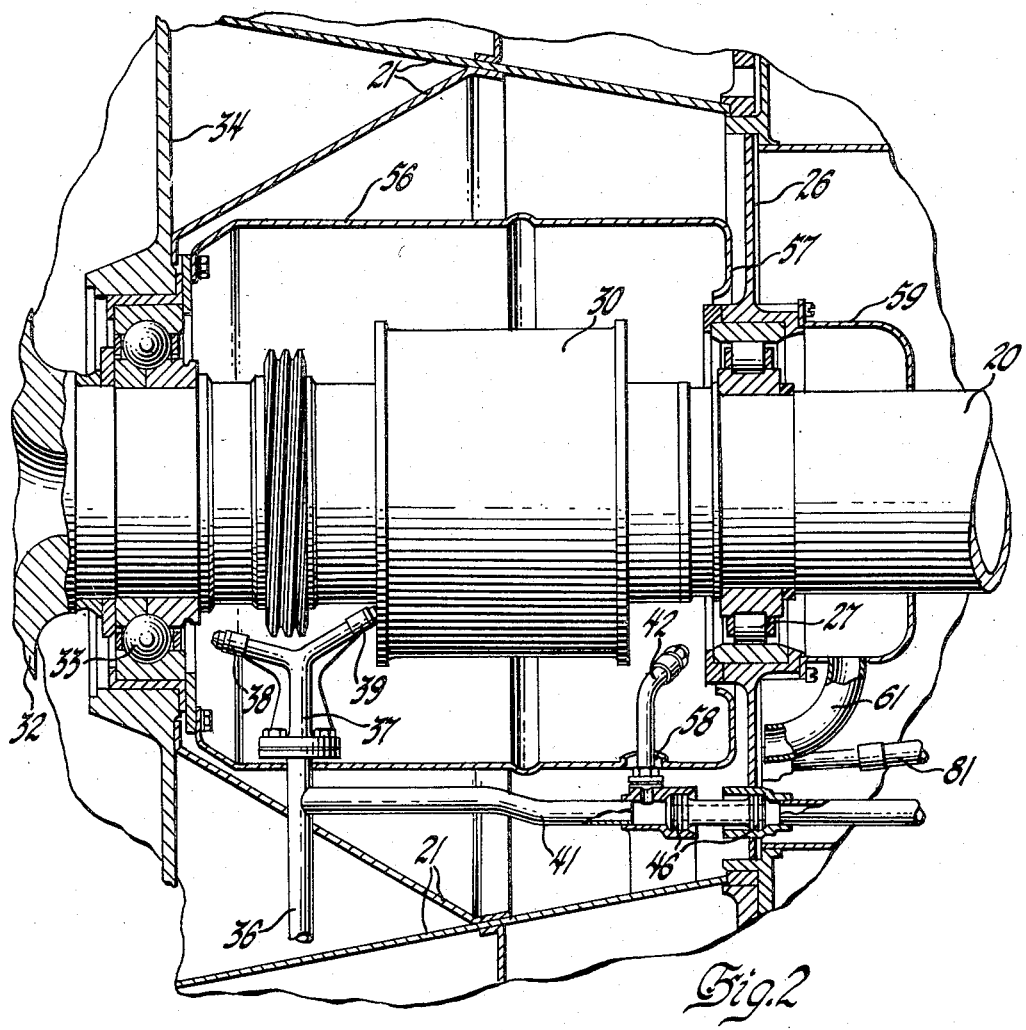
Fig. 2 is a similar view on a larger scale of structure adjacent the front end of the turbine shaft.
Figure 3:
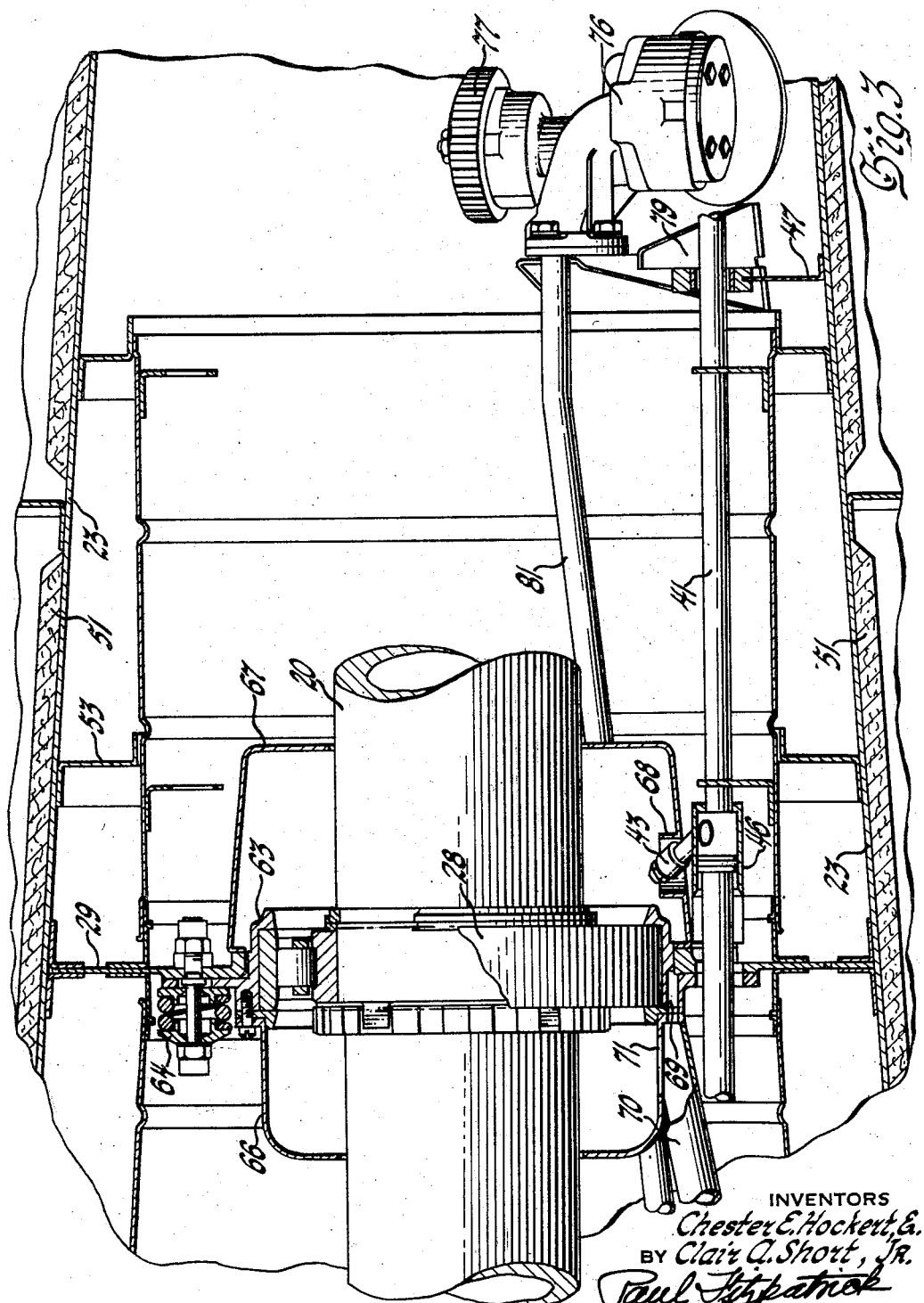
Fig. 3 is a similar view on the larger scale of structure adjacent the middle portion of the turbine shaft.
Figure 4:
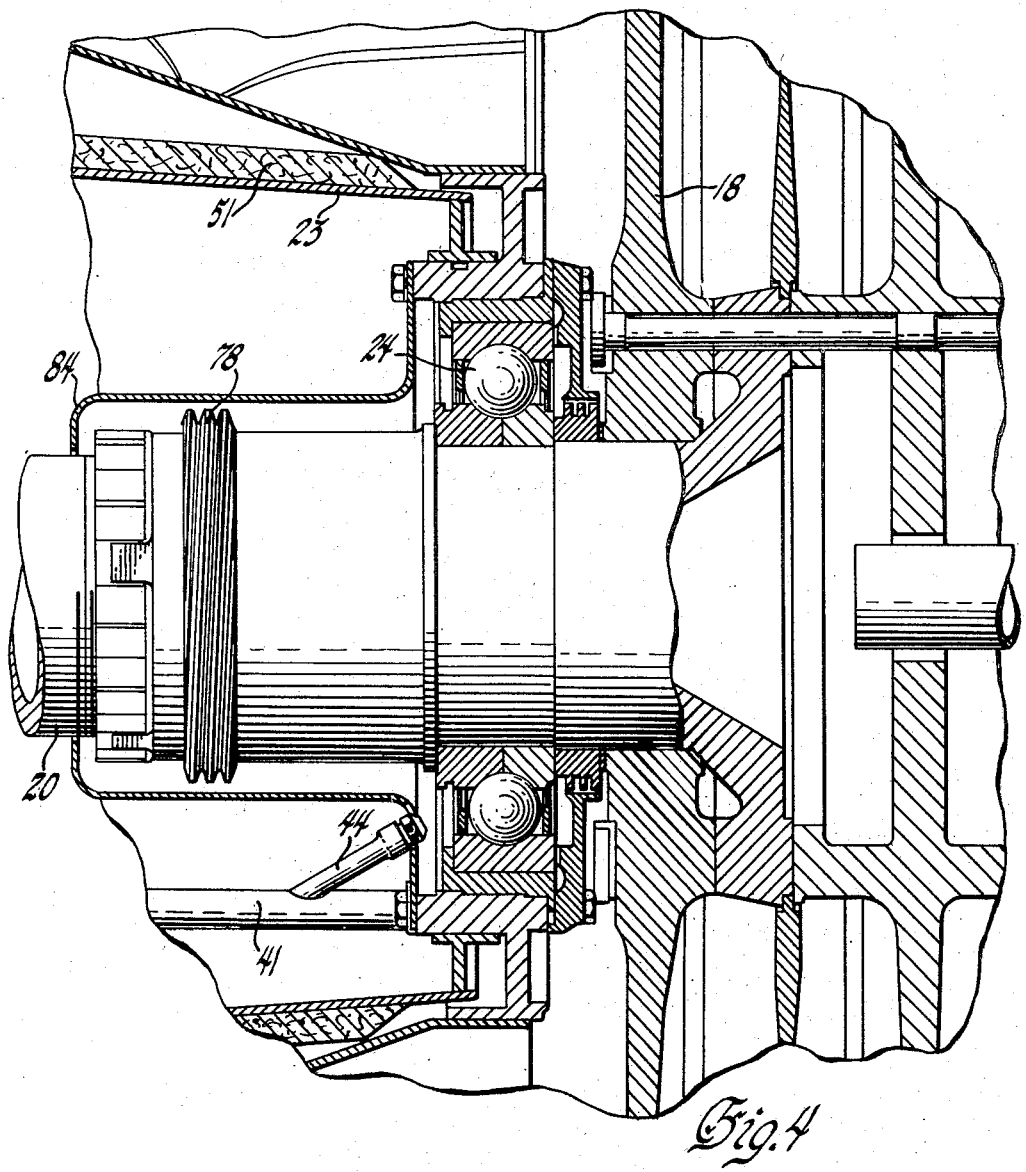
Fig. 4 is a similar view on an enlarged scale of structure adjacent the rear end of the turbine shaft.

Referring first to Fig. 1, it will be appreciated that much structure the details of which are immaterial to the invention is shown only generally. The engine comprises a compression section A, a midframe B, a combustion section C, and a turbine D. The midframe B defines an annular diffuser 10 through which compressed air flows into a combustion annulus 11 containing flame tubes 12 in which the air is heated by fuel entering through nozzles 13. Combustion products are discharged from the flame tubes 12 through transition sections 14 and turbine nozzle vanes 16 against blades 17 of a turbine wheel 18, and, if provided, subsequent turbine wheels.

The combustion chamber comprises an inner shroud 19. The midframe B defines an inner wall 21 and a rear wall 22. An aft frame 23 extends from the midframe B to the turbine. The aft frame 23 is a slightly tapering cone with a front flange bolted to the rear wall 22 of the midframe and extending within the inner shroud 19 of the combustion chamber. The aft frame supports a rear turbine shaft bearing 24 adjacent the first turbine wheel and a plate or disk 26 fixed to the front end of the aft frame supports the forward turbine shaft bearing 27. An intermediate steady bearing 28, which is provided to damp whipping of the turbine shaft, is supported by a plate 29 extending inwardly from the aft frame. The forward end of the turbine shaft 20 extends slightly ahead of the bearing 27 and is coupled by an internally splined sleeve 30 to the hub 31 of the rear compressor wheel or disk 32. Hub 31 is supported in a ball bearing 33 and the forward end of the compressor is supported in a bearing (not shown). Bearing 33 is mounted in a web or plate 34 at the front end of the midframe B.

Oil under pressure to lubricate the bearings 33, 27, 28, and 24 and the splined coupling 30 is introduced through a line 36 leading through the midframe from a suitable pump (not shown). Line 36 supplies a fitting 37 comprising a jet 38 to lubricate bearing 33 and a jet 39 which squirts oil into the interior of the coupling member 30. Oil line 41 extends rearwardly from line 36 past the jet 42 which supplies oil to the front turbine shaft bearing 27 and a jet 43 which lubricates the bearing 28. Line 41 leads to a jet 44 which oils the turbine thrust bearing 24. Quick disconnect slip couplings are provided in oil line 41 at points 46 so that it can be readily taken apart. A support 47 is provided for line 41 adjacent the rear end thereof.

A refractory insulating blanket 51 is provided on the outer surface of the aft frame 23. A tubular or generally cylindrical heat shield 52 extends most of the length of the aft frame 23 and is supported therein by flanges 53 extending from the shield 52. The shield and flanges are of bright finished metal so as to reflect heat as much as possible, and the shield is ribbed to increase its strength. An annular generally cylindrical oil shield 56 is bolted to the plate 34 adjacent the compressor bearing 33 and extends rearwardly to constitute a housing for the coupling member 30 and terminate in a flange 57 which is recurved and lies closely adjacent the flange of plate 26 which supports the front turbine shaft bearing 27. Oil line 36 and jet 42 extend through openings in the bottom of shield 56. An oil shield 59 bolted to the support for bearing 27 extends rearwardly over this bearing and has a flange which closely approaches the turbine shaft 20 to provide a rather complete enclosure for the bearing. An L-shaped drain tube 61 extends from the bottom of the shield 59 and discharges into the inner wall 21 of the midframe. Oil supplied to bearings 33 and 27 and the coupling 30 thus drains through the opening 58 or the elbow 61 into the midframe which defines a sump from which it is picked up by a scavenge pump (not shown) for return to the oil supply pump.

Intermediate turbine shaft bearing 28 is supported in plate 29 by means of a ring 63 mounted on plate 29 by frictional mounts 64 in known manner so that any whip of the shaft will be damped by friction associated with radial movement of the bearing. A forward splash shield 66 is mounted on ring 63 and a rear splash shield 67 is mounted on plate 29; both these shields are provided with openings for the turbine shaft. An upwardly flanged opening 68 in the bottom of shield 67 admits the oil jet 43. The flange of the opening 68 acts as a dam for oil which collects in the bottom of he shield 67. This oil flows through passages 69 in the retaining ring 63 into an oil return tube 70 which also communicates through an opening 71 with the shield 66. Return tube 70 extends to the forward end of the aft frame where it discharges into the midframe.

The turbine main bearing 24 has associated with it a scavenge pump 76 with a driving gear 77 coupled to a worm 78 on the turbine shaft. Pump 76 is supported on a bracket 79 extending from the aft frame wall and discharges through line 81 into the midframe.

A splash shield 84 bolted to the support for bearing 24 provides a nearly closed chamber around the front of the bearing and over the worm 78, providing a sump which communicates with pump 76 which returns the oil forward.

It will be seen that the long intermediate shield 52 and the internal shields 56, 59, 66, 67, and 84 cooperate to protect the bearings and the oil flowing to and from them from heat radiated from the aft frame and protect the oil against contact with the hot frame. All these shields are preferably of bright sheet metal which reflects heat and are of light gauge and thus conduct very little heat from their supports into the oil in the shields.

The resulting protection of the oil from heat is highly beneficial to bearing and pump endurance and oil consumption.

Detailed description herein of the preferred embodiment of the invention is not to be considered as limiting the invention which may be modified by the exercise of skill in the art within the principles thereof.

We claim:

1. A gas turbine engine comprising, in combination, a compressor; a combustion apparatus supplied thereby; a turbine supplied by the combustion apparatus, the turbine and compressor being coaxial and spaced axially of their common axis, the combustion apparatus being mounted axially between the compressor and turbine and extending from the compressor to the turbine; an annular frame extending from the compressor to the turbine within the combustion apparatus; drive shaft means connecting the turbine and compressor extending through the frame, the shaft means including a shaft coupling adjacent the compressor; bearings for the shaft means supported within the frame comprising a bearing adjacent the coupling, a bearing adjacent the turbine, and a shaft bearing intermediate the other said bearings; an annular heat shield extending along the shaft means between the shaft means and the frame; a splash shield for each said bearing closely enclosing the bearing and a splash shield for the shaft coupling closely enclosing the coupling, the splash shields for the coupling, the bearing adjacent thereto, and the intermediate bearing being within the heat shield; means within the heat shield for conducting lubricating oil to the bearings and coupling; the splash shields being adapted to receive scavenge oil from the respective bearings and coupling and collect it out of contact with the heat shield; and means for conducting the scavenge oil from the splash shields out of the frame, the last-named means being within the heat shield and thereby shielded from the frame; the heat shield and splash shields being of bright-surfaced light gauge metal.

2. A gas turbine engine comprising, in combination, a compressor; a combustion apparatus supplied thereby; a turbine supplied by the combustion apparatus, the turbine and compressor being coaxial and spaced axially of their common axis, the combustion apparatus being mounted axially between the compressor and turbine and extending from the compressor to the turbine; an annular frame extending from the compressor to the turbine within the combustion apparatus; drive shaft means connecting the turbine and compressor extending through the frame, the shaft means including a shaft coupling adjacent the compressor; bearings for the shaft means supported within the frame comprising a bearing adjacent the coupling and a bearing adjacent the turbine; an annular heat shield of bright metal extending along the shaft means between the shaft means and the frame; a splash shield for each said bearing closely enclosing the bearing and a splash shield for the shaft coupling closely enclosing the coupling, the splash shields for the coupling and the bearing adjacent thereto; means within the heat shield for conducting lubricating oil to the bearings and coupling; the splash shields being adapted to receive scavenge oil from the respective bearings and coupling and collect it out of contact with the heat shield; and means for conducting the scavenge oil from the splash shields out of the frame, the last-named means being within the heat shield and thereby shielded from the frame the splash shield for the bearing adjacent the coupling enclosing the end of the bearing away from the coupling, and the coupling splash shield extending closely adjacent and enclosing the other end of the said adjacent bearing; the splash shield for the bearing adjacent the coupling having means for draining scavenge oil therefrom into the coupling splash shield; the heat shield and splash shields being of bright-surfaced light gauge metal.

3. A gas turbine engine comprising, in combination, a compressor; a combustion apparatus supplied thereby; a turbine supplied by the combustion apparatus, the turbine and compressor being coaxial and spaced axially of their common axis, the combustion apparatus being mounted axially between the compressor and turbine and extending from the compressor to the turbine; an annular frame extending from the compressor to the turbine within the combustion apparatus; drive shaft means connecting the turbine and compressor extending through the frame; bearings for the shaft means supported within the frame comprising a bearing adjacent the compressor, a bearing adjacent the turbine, and a shaft bearing intermediate the other said bearings; an annular heat shield extending along the shaft means between the shaft means and the frame; a splash shield for each said bearing closely enclosing the bearing, the splash shields for the bearing adjacent the compressor and the intermediate bearing being within the heat shield; means within the heat shield for conducting lubricating oil to the bearings; the splash shields being adapted to receive scavenge oil from the respective bearings and collect it out of contact with the heat shield; and means for conducting the scavenge oil from the splash shields out of the frame, the last-named means being within the heat shield and thereby shielded from the frame; the heat shield and splash shields being of bright-surfaced light gauge metal.

References Cited in the file of this patent

UNITED STATES PATENTS

| | | |
|---|---|---|
| 2,432,359 | Streid | Dec. 9, 1947 |
| 2,479,573 | Howard | Aug. 23, 1949 |
| 2,548,886 | Howard | Apr. 17, 1951 |
| 2,639,579 | Willgoos | May 26, 1953 |
| 2,692,724 | McLeod | Oct. 26, 1954 |